United States Patent
Tischler

(10) Patent No.: US 7,107,494 B1
(45) Date of Patent: Sep. 12, 2006

(54) BUS ARCHITECTURE USING DEBUG PACKETS TO MONITOR TRANSACTIONS ON AN INTERNAL DATA PROCESSOR BUS

(75) Inventor: Brett A. Tischler, Longmont, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 624 days.

(21) Appl. No.: 10/426,040

(22) Filed: Apr. 29, 2003

(51) Int. Cl.
*G06F 11/00* (2006.01)

(52) U.S. Cl. .......................... 714/43; 714/40; 714/44; 714/25

(58) Field of Classification Search .............. 714/25, 714/40, 43, 44; 710/305–306, 316–317
See application file for complete search history.

(56) References Cited

U.S. PATENT DOCUMENTS

| | | | |
|---|---|---|---|
| 5,826,058 A | 10/1998 | Hartvigsen et al. | |
| 5,903,912 A | 5/1999 | Hansen | |
| 6,226,698 B1 | 5/2001 | Yeung et al. | |
| 6,324,663 B1 * | 11/2001 | Chambers | 714/726 |
| 6,327,207 B1 | 12/2001 | Sluiter et al. | |
| 6,453,429 B1 * | 9/2002 | Sadana | 714/43 |
| 6,526,525 B1 * | 2/2003 | Chang | 714/40 |
| 6,643,811 B1 * | 11/2003 | Chambers | 714/726 |
| 6,792,563 B1 * | 9/2004 | DesRosier et al. | 714/43 |
| 2002/0174387 A1 * | 11/2002 | Lohoff et al. | 714/43 |
| 2004/0193768 A1 * | 9/2004 | Carnevale et al. | 710/260 |

* cited by examiner

*Primary Examiner*—Scott Baderman
*Assistant Examiner*—Timothy M. Bonura

(57) ABSTRACT

A processing system comprising: i) processor core; ii) a memory; iii) N peripheral devices; and iv) a communication bus coupled to the processor core, the memory and the N peripheral devices that transfers bus request packets between the processor core, the memory, and the N peripheral devices. The communication bus comprises debug circuitry for capturing bus transaction data associated with a bus transaction between a first of the peripheral devices and a second of the peripheral devices and transferring the captured bus transaction data to an external test device.

13 Claims, 3 Drawing Sheets

US 7,107,494 B1

BUS ARCHITECTURE USING DEBUG PACKETS TO MONITOR TRANSACTIONS ON AN INTERNAL DATA PROCESSOR BUS

TECHNICAL FIELD OF THE INVENTION

The present invention is generally directed to data processors and, in particular, to a data processor that captures test data associated with transactions on an internal bus and reflects the test data to an external device.

BACKGROUND OF THE INVENTION

In recent years, there have been great advancements in the speed, power, and complexity of integrated circuits, such as application specific integrated circuit (ASIC) chips, random access memory (RAM) chips, microprocessor (uP) chips, and the like. These advancements have made possible the development of system-on-a-chip (SOC) devices. An SOC device integrates into a single chip many of the components of a complex electronic system, such as a wireless receiver (i.e., cell phone, a television receiver, and the like). SOC devices greatly reduce the size, cost, and power consumption of the system.

SOC data processors are characterized by a very high degree of integration on a single integrated circuit (IC) chip. Many of the peripheral components now integrated onto the same IC chip as a processor core would have been implemented as separate IC chips in a previous generation of processors. Advantageously, this decreases the amount of board space required, reduces the effects of noise, allows for low-voltage operations, and, in many cases, reduces the pin count of the SOC device.

However, many SOC designs are increasingly encountering new problem related to the lack of visibility of key interface points in the SOC design. Interface points that were previously externally visible (i.e., accessible) between separate IC chips in earlier designs are now internal points on a single IC chip. This is particularly true of processor buses that interconnect the processor core, memory and peripheral components. Previously, logic analyzers could be coupled directly to the address, data and control lines of processor buses in order to perform debugging and testing procedures.

In new designs, however, these buses are internal to the SOC device. This makes testing and debugging operations more complex. In order to test the operation of an internal bus, the logic analyzer also must be integrated onto the IC chip and the test data must be brought out onto external pins. Unfortunately, this increases the pin-count of the SOC device, an undesirable result.

Therefore, there is a need in the art for improved system-on-a-chip (SOC) devices and other large-scale integrated circuits. In particular, there is a need for improved apparatuses and methods for monitoring transactions on an internal bus in a system-on-a-chip (SOC) device. More particularly, there is a need for improved apparatuses and methods for monitoring transactions on an internal bus in an SOC device without increasing the pin count of the SOC device.

SUMMARY OF THE INVENTION

To address the above-discussed deficiencies of the prior art, it is a primary object of the present invention to provide a processing system comprising: i) processor core; ii) a memory; iii) a plurality of peripheral devices; and iv) a communication bus coupled to the processor core, the memory and the plurality of peripheral devices and capable of transferring bus request packets between the processor core, the memory, and the plurality of peripheral devices. According to an advantageous embodiment of the present invention, the communication bus comprises debug circuitry capable of capturing bus transaction data associated with a bus transaction between a first of the peripheral devices and a second of the peripheral devices and transferring the captured bus transaction data to an external test device.

According to one embodiment of the present invention, the debug circuitry transfers the captured bus transaction data to the external test device via a third of the peripheral devices.

According to another embodiment of the present invention, the third peripheral device comprises a Peripheral Component Interconnect (PCI) bus interface.

According to still another embodiment of the present invention, the debug circuitry comprises a debug packet buffer capable of storing a request address associated with the captured bus transaction data.

According to yet another embodiment of the present invention, the debug packet buffer is further capable of storing a request identifier associated with the captured bus transaction data.

According to a further embodiment of the present invention, the debug packet buffer is further capable of storing priority bits associated with the captured bus transaction data.

According to a still further embodiment of the present invention, the debug packet buffer is further capable of storing write data associated with the captured bus transaction data that is being written to the second peripheral device.

According to a yet further embodiment of the present invention, the debug packet buffer is further capable of storing read data associated with the captured bus transaction data that is being read from the first peripheral device.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
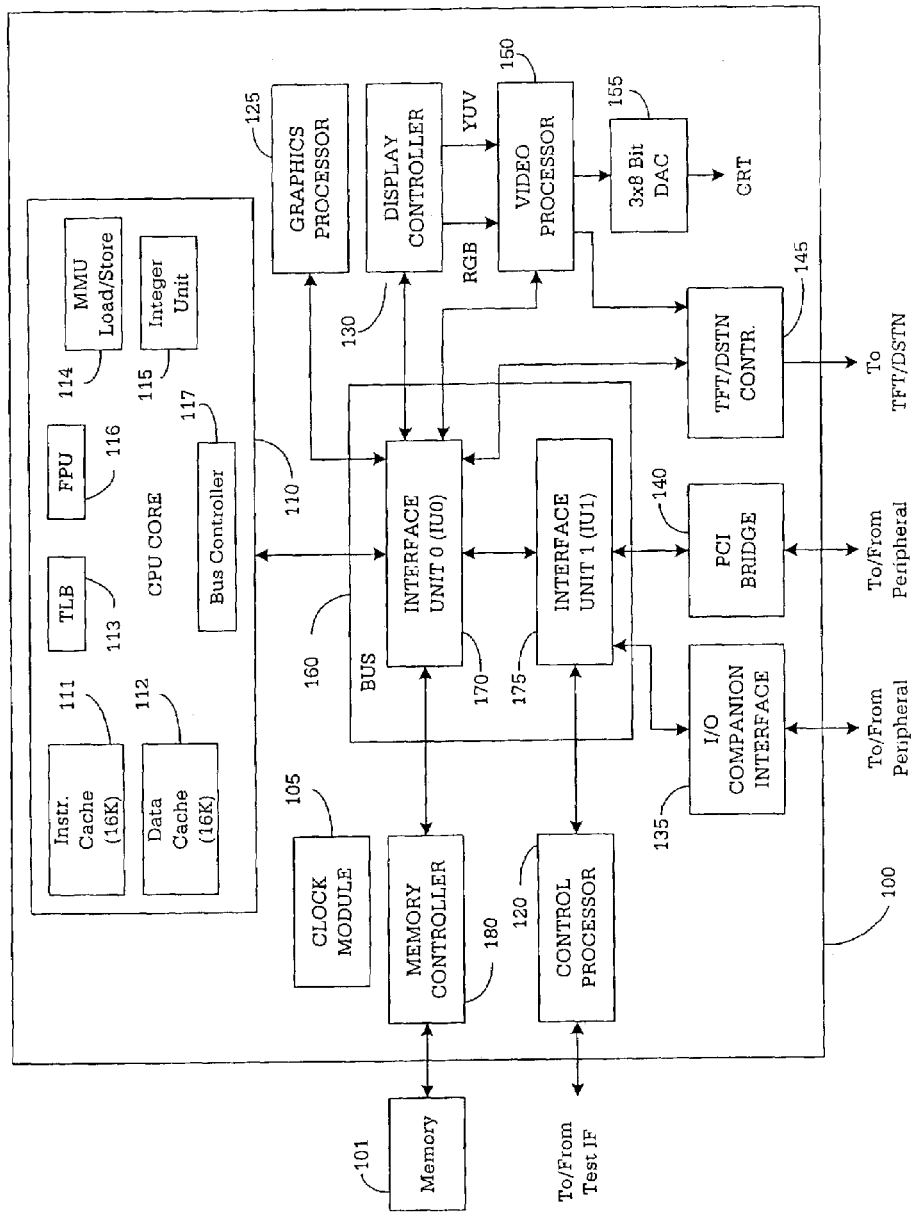
FIG. 1 illustrates an exemplary processing system according to one embodiment of the present invention.
Figure 2:
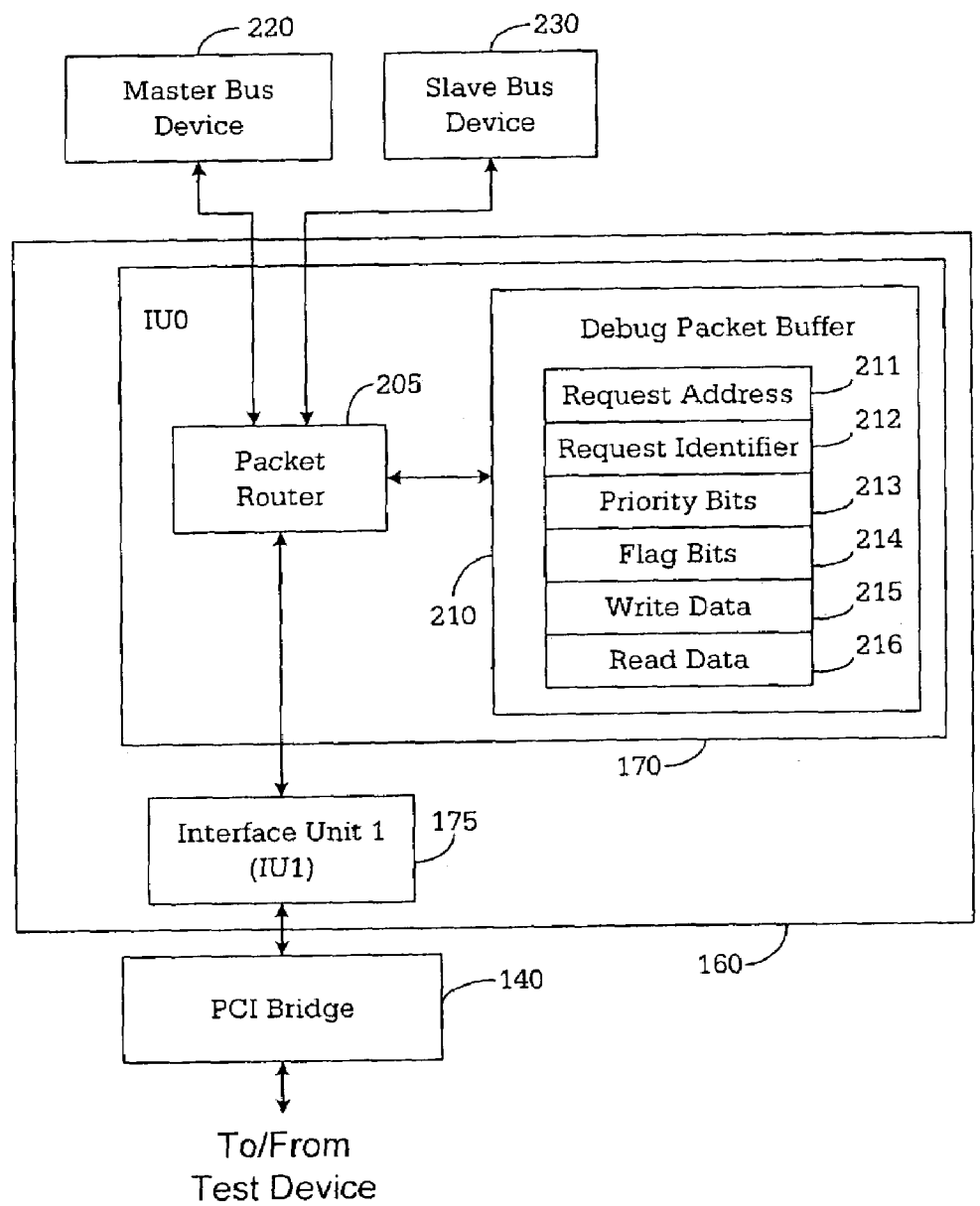
FIG. 2 illustrates the debug packet circuitry in the internal bus of the processing system in FIG. 1 according to an exemplary embodiment of the present invention.
Figure 3:
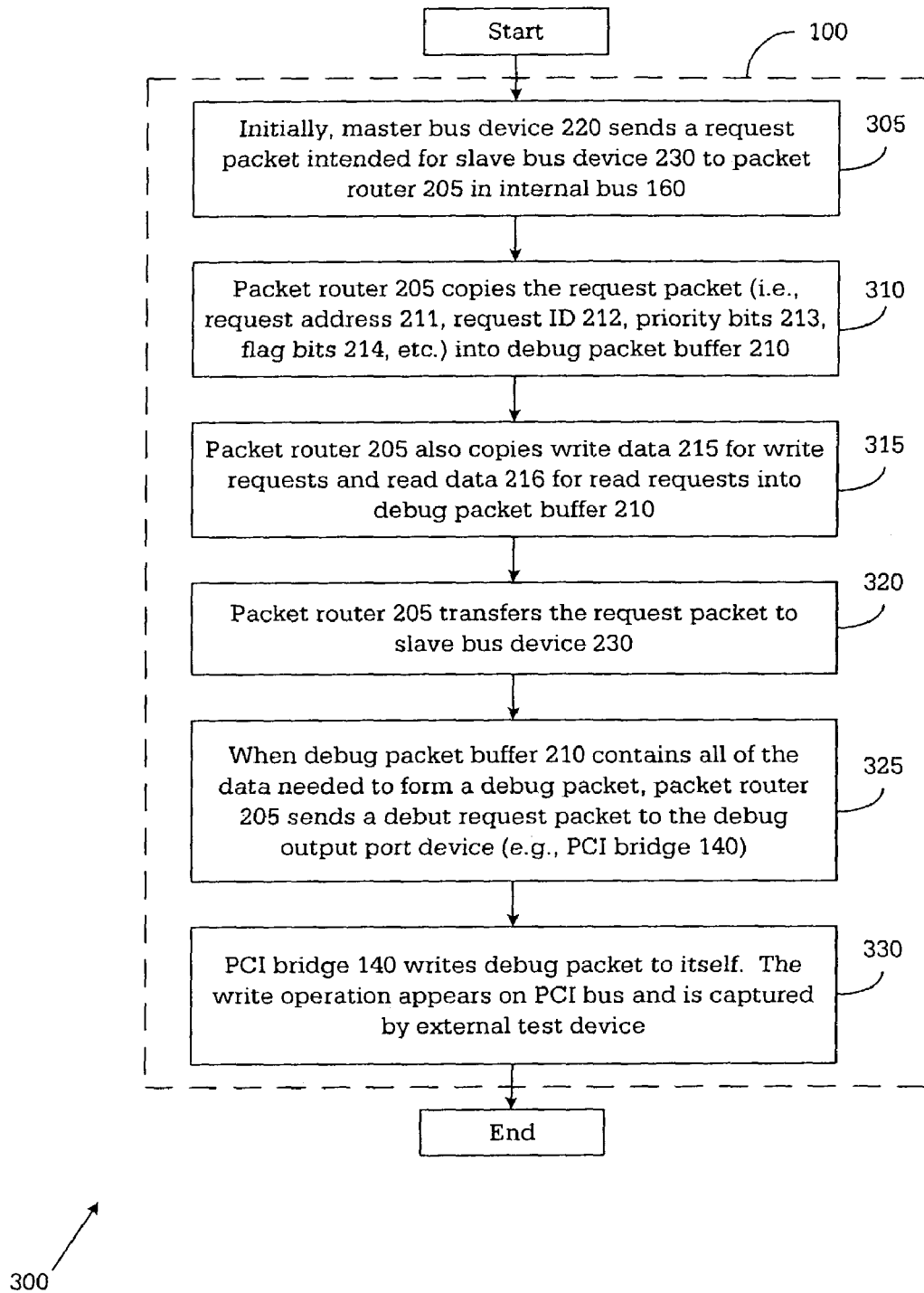
FIG. 3 is a flow diagram illustrating the operation of the debug packet circuitry in the internal bus.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged system-on-a-chip (SOC) device.

FIG. 1 illustrates exemplary processing system 100 according to one embodiment of the present invention. In the exemplary embodiment, processing system 100 is a highly integrated system-on-a-chip (SOC) device designed to power information appliances (IA) for entertainment, educational, and/or business purposes. However, this is by way of illustration only and those skilled in the art will recognize that the present invention may be integrated into other types of SOC devices, such as cell phone transceivers, television receivers, radio receivers, and the like.

Processing system 100 comprises clock module 105, central processing unit (CPU) core 110, control processor 120, graphics processor 125, display controller 130, input/output (I/O) companion interface (IF) 135, peripheral component interconnect (PCI) bridge 140, TFT/DSTN controller 145, video processor 150, 3×8 bit digital to analog converter (DAC) 155, internal bus 160, and memory controller 180.

CPU core 110 comprises instruction cache 111, data cache 112, translation look-aside buffer (TLB) 113, memory management unit (MMU) load/store block 114, integer unit (IU) 115, floating point unit (FPU) 116, and bus controller 117. According to an exemplary embodiment of the present invention, instruction cache 111 is 16 kilobytes and data cache 112 is 16 kilobytes. Internal bus 160 comprises interface unit 0 (IU0) 170 and interface unit 1 (IU1) 175.

According to an exemplary embodiment of the present invention, CPU core 110 is an x86 compatible device and FPU 116 is an x87 compatible device. The instruction set supported by CPU core 110 may be a combination of the instruction sets implemented by the Intel Pentium™ processor, the AMD™ K6 and K7 processors, and the National Semiconductor Corporation™ (NSC) GX1 processor.

Integer unit 115 comprises an instruction pipeline and associated logic. According to an exemplary embodiment, IU 115 consists of a single-issue eight-stage pipeline. The eight stages of the instruction pipeline in IU 115 are:

1) Instruction Pre-fetch stage;
2) Instruction Pre-decode stage;
3) Instruction Decode stage;
4) Instruction Queue stage;
5) Address Calculation 1 stage;
6) Address Calculation 2 stage;
7) Execution Unit stage; and
8) Writeback stage.

In the Instruction Pre-fetch stage, the raw instruction is fetched from the instruction memory cache. The Instruction Pre-decode stage extracts prefix bytes from the raw instruction bits. The pre-decode operation looks-ahead to the next instruction and a potential bubble can be eliminated if the pipeline stalls downstream. The Instruction Decode stage performs full decode of the instruction data and indicates the instruction length back to the Pre-fetch stage, thereby allowing the Pre-fetch stage to shift the appropriate number of bytes to the beginning of the next instruction.

The Instruction Queue stage comprises a FIFO containing decoded x86 instructions. The Instruction Queue allows the Instruction Decode stage to proceed even if the pipeline is stalled downstream. Register read operations for data oper- and address calculations are performed in the Instruction Queue stage. The Address Calculation 1 stage computes the linear address of operand data (if required) and issues requests to data cache 112. Microcode can take over the pipeline and inject a micro-box if multi-box instructions require additional data operands. In Address Calculation 2 stage, operand data (if required) is returned and set up to the Execution Unit stage with no bubbles if there was a data cache hit. Segment limit checking also is performed on the data operand address. The micro-read-only-memory (μROM) is read for setup to Execution Unit stage.

In the Execution Unit stage, register and/or data memory fetches are fed through the Arithmetic Logic Unit (ALU) for arithmetic or logical operations. The PROM always fires for the first instruction box into the pipeline. Microcode may control the pipeline and insert additional boxes in the Execution Unit stage if the instruction requires multiple Execution Unit stages to complete. The Writeback stage writes results of the Execution Unit stages to the register file or to data memory.

The memory subsystem of CPU core 110 supplies IU 115 pipeline with instructions, data, and translated addresses. To support efficient delivery of instructions, the memory subsystem uses instruction cache 111 and TLB 113. According to an exemplary embodiment of the present invention instruction cache 111 may be a single clock access, 16 KB, 4-way set associative cache and TLB 113 may be an 8-entry, fully associative, translation look-aside buffer for data and an 8-entry, fully associative, translation look-aside buffer for instructions. TLB 113 performs necessary address translations when in protected mode.

TLB 113 may also comprise a second-level (L2) unified (instruction and data), 64-entry, 2-way set associative TLB that is accessed when there is a miss to the instruction TLB or the data TLB. The L2 unified TLB takes an additional clock to access. When there is a miss to the instruction or data caches or the TLB, the access must go to memory controller 180 for processing. The use of instruction cache 111, data cache 112 and their associated TLB in TLB 113 improves the overall efficiency of integer unit 115 by enabling simultaneous access to both instruction cache 111 and data cache 112.

Floating-point unit (FPU) 116 is a pipelined arithmetic unit that performs floating-point operations in accordance with the IEEE 754 standard. FPU 116 is a pipelined machine with dynamic scheduling of instructions to minimize stalls due to data dependencies. FPU 116 performs out-of-order execution and register renaming. FPU 116 is designed to support an instruction issue rate of one instruction per clock from the integer core. The data path is optimized for single precision arithmetic. Extended precision instructions are handled in microcode and require multiple passes through the pipeline. According to an exemplary embodiment, FPU 116 comprises an execution pipeline and a load/store pipeline, thereby enabling load/store operations to execute in parallel with arithmetic instructions.

Control processor 120 is responsible for reset control, macro-clock management, and debug support provided in processing system 100. Control processor 120 comprises a JTAG interface and the scan chain control logic. Control processor 120 supports chip reset, which includes initial phase-locked loop (PLL) control and programming, and runtime power management macro-clock control. The JTAG support includes a TAP controller that is IEEE 1149.1 compliant. CPU control can be obtained through the JTAG interface into the TAP Controller, and all internal registers, including CPU core 110 registers, may be accessed. In-circuit emulation (ICE) capabilities are supported through the JTAG and TAP Controller interface.

As noted above, internal bus 160 comprises two interface units: IU0 170 and IU1 175. IU0 170 connects six high-speed modules together with a seventh link to IU1 175. IU1 175 connects to three low-speed modules, namely I/O companion IF 135, PCI bridge 140, and TFT/DSTN controller 145.

Memory controller 180 is the source for all access to memory 101 in processing system 100. Memory controller 180 supports a memory data bus width of sixty-four (64) bits. Memory controller 180 supports two types of memory 101. The first type of memory 101 is a 111 MHz 222 MT/S for DDR (Dual Data Rate) The second type of memory 101 is a 133 MHz for SDR (Single Data Rate). Memory controller 180 supports up to one gigabyte (1 GB) of either SDR memory 101 or DDR memory 101.

The modules that need access to memory 101 are CPU core 110, graphics processor 125, display controller 130, and TFT/DSTN controller 145. Because memory controller 180 supports memory needs for both CPU core 110 and the display subsystem, memory controller 180 is classically referred to as a Unified Memory Architecture (UMA) memory subsystem. According to an exemplary embodiment of the present invention, graphics processor 125 is a BitBLT/vector engine that supports pattern generation, source expansion, pattern/source transparency, and 256 ternary raster operations.

Display controller 130 performs the following functions: 1) retrieval of graphics, video, and overlay streams from the frame buffer; 2) serialization of the streams; 3) any necessary color look-ups and output formatting; and 4) interfacing with the display filter for driving the display device(s) (not shown). Display controller 130 may comprise a graphical user interface (GUI) and a VGA, which provides full hardware compatibility with the VGA graphics standard. The VGA passes 8-bit pixels and sync signals to the GUI, which expands the pixels to 24 BPP via the color lookup table and passes the information to video processor 150. Video processor 150 ultimately generates the digital red, green, and blue signals and buffers the sync signals, which are then sent to DAC 155 or the flat panel interface.

Video processor 150 mixes the graphics and video streams, and outputs digital RGB data to DAC 155 or the flat panel interface, depending upon the part (i.e., cathode ray tube (CRT) or flat panel (FP)). Video processor 150 is capable of delivering high resolution and true color graphics. Video processor 150 may also overlay or blend a scaled true color video image on the graphics background.

TFT/DSTN controller 145 converts the digital RGB output of a video mixer block to the digital output suitable for driving a dual-scan color STN (DSTN) flat panel LCD. TFT/DSTN controller 145 connects to the digital RGB output of video processor 150 and drives the graphics data onto a dual-scan flat panel LCD. According to an exemplary embodiment, TFT/DSTN controller 145 may drive all standard dual-scan color STN flat panels up to 1024×768 resolution.

PCI bridge 140 contains all the necessary logic to support a standard external PCI interface. The PCI interface is PCI 2.2 specification compliant. PCI bridge 140 comprises the PCI and Interface Unit control, read and write FIFOs, and a PCI arbiter. I/O companion IF 135 handles several unique signals that support system reset, system interrupts, and power system managements.

For the purposes of debugging and testing the operation of processing system 100, it is often necessary to monitor bus transactions on internal bus 160. In particular, it is important to be able to monitor transactions between a first (or master) bus device coupled to internal bus 160 and a second (or slave) bus device coupled to internal bus 160. For example, a debug procedure may need to capture bus transactions at full operating speed between display controller 130 and memory controller 180. Control processor 120 is insufficient for these purposes.

The present invention provides a novel apparatus and a related method that, during debug (or test) mode, enable internal bus 160 to capture information related to bus transactions between a first selected (master) bus device and a second selected (slave) bus device. The bus transaction is executed between the master and slave bus devices by internal bus 160 in the conventional manner. However, data packets of the captured bus transaction information (i.e., debug packets) are mirrored out to an external testing (or debug) device via an external interface. This occurs in parallel with the bus transaction itself. For example, internal bus 160 may transfer the captured bus transaction information to an external test device coupled to PCI bridge 140 or to I/O companion interface 135.

FIG. 2 illustrates selected portions of internal bus 160 of processing system 100 that capture bus transaction information according to an exemplary embodiment of the present invention. Internal bus 160 comprises packet router 205 and debug packet buffer 210. Debug packet buffer 210 stores request address 111, request identifier 212, priority bits 213, flag bits 214, write data 215, and read data 216.

During normal mode, packet router 205 in interface unit 170 (IU0) receives a bus access request packet from a requesting device (i.e., master bus device 220) coupled to internal bus 160 and routs the request packet to a target device (i.e., slave bus device 230) coupled to internal bus 160 that is the target of the request packet. However, during test (or debug) mode, packet router 205 transfers a copy of the request packet to debug packet buffer 210 for subsequent transfer to an external test device, such as one coupled to PCI bridge 140.

FIG. 3 depicts flow diagram 300, which illustrates the operation of the debug packet circuitry in internal bus 160 according to an exemplary embodiment of the present invention. During test mode, master bus device 220 initially sends a request packet intended for slave bus device 230 to packet router 205 in internal bus 160 (process step 305). Packet router 205 copies the request packet (e.g., request address 211, request ID 212, priority bits 213, flag bits 214, and the like) into debug packet buffer 210 (process step 310). Next, packet router 205 copies write data 215 for write requests and read data 216 for read requests into debug packet buffer 210 (process step 315). In parallel with the foregoing steps, packet router 205 transfers the request packet to slave bus device 230 (process step 320). When debug packet buffer 210 contains all of the data needed to form a debug packet, packet router 205 sends a debut request packet to the debug output port device (e.g., PCI bridge 140) (process step 325).

If PCI bridge 140 is the debug output port device, PCI bridge 140 initiates a write operation to a reserved memory location that PCI bridge 140 can also accept. In this manner, PCI bridge 140 both masters the write operation and acts as the slave device accepting the write. Doing this causes the PCI transaction to appear on the PCI bus, but does not require any external device to accept the transaction. The write data in the PCI request message consists of the request, priority, flags, and the like, and either the read data or the write data associated with the request. Flags contain additional information about the request, such as master identifier, source identifier within a master (i.e., Data, Instruction, TLB, Video, graphics, and the like) (process step 330).

It should be understood that the present invention is not required to copy (or mirror) the bus transaction information to PCI bridge 140. Those skilled in the art will recognize that the contents of debug packet buffer 210 may be written to any device coupled to internal bus 160 and then transferred to an external test device. Also, processing system 100 and internal bus 160 may enter debug (or test) mode by any conventional means, including, for example, by receiving a test mode enable command from an external testing device coupled to control processor 120 or to PCI bridge 140.

Although the present invention has been described with an exemplary embodiment, various changes and modifications may be suggested to one skilled in the art. It is intended that the present invention encompass such changes and modifications as fall within the scope of the appended claims.

What is claimed is:

1. In a system-on-a chip (SOC) device comprising: a processor core; a memory; a plurality of peripheral devices; an external interface; and a communication bus coupled to the processor core, the memory, the external interface and the plurality of peripheral devices and capable of transferring bus request packets between the processor core, the memory, and the plurality of peripheral devices, a method of monitoring the operation of the SOC device comprising:
    capturing bus transaction data associated with a bus transaction between a first of the peripheral devices and a second of the peripheral devices; and
    transferring the captured bus transaction data to the external interface of the SOC device.

2. The method as set forth in claim 1 wherein a third of the peripheral devices comprises the external interface and wherein transferring the captured bus transaction data comprises transferring the captured bus transaction data to an external test device via the third peripheral device.

3. The method as set forth in claim 2 wherein the third peripheral device comprises a Peripheral Component Interconnect (PCI) bus interface.

4. The method as set forth in claim 1, wherein transferring the captured bus transaction data comprises transferring the captured bus transaction data to an external test device via the external interface.

5. A processing system comprising:
    a processor core;
    a memory;
    a plurality of peripheral devices;
    a communication bus coupled to said processor core, said memory and said plurality of peripheral devices and capable of transferring bus request packets between said processor core, said memory, and said plurality of peripheral devices, wherein said communication bus comprises debug circuitry capable of capturing bus transaction data associated with a bus transaction between a first of said peripheral devices and a second of said peripheral devices and transferring said captured bus transaction data to an external test device via a third of said peripheral devices; and
    wherein said debug circuitry comprises a debug packet buffer capable of storing a request address associated with said captured bus transaction data and capable of storing at least one of priority bits associated with said captured bus transaction data, write data associated with said captured bus transaction data that is being written to said second peripheral device, or read data associated with said captured bus transaction data that is being read from said first peripheral device.

6. The processing system as set forth in claim 5 wherein said debug packet buffer is further capable of storing status flag bits associated with said captured bus transaction data.

7. The processing system as set forth in claim 5 wherein said debug packet buffer is capable of storing write data associated with said captured bus transaction data that is being written to said second peripheral device.

8. The processing system as set forth in claim 5 wherein said debug packet buffer is capable of storing read data associated with said captured bus transaction data that is being read from said first peripheral device.

9. The processing system as set forth in claim 5 wherein said debug packet buffer is capable of storing priority bits associated with said captured bus transaction data.

10. In a system-on-chip (SOC) device comprising:
    a processor core; a memory; a plurality of peripheral device; an external interface; and a communication bus coupled to the processor core, the memory, the external interface and the plurality of peripheral devices and capable of transferring bus request packets between the processor core, the memory, and the plurality of peripheral devices, a method of monitoring the operation of the SOC device comprising:
    means for capturing bus transaction data associated with a bus transaction between a first of the peripheral devices and a second of the peripheral devices; and
    means for transferring the captured bus transaction data to the external interface of the SOC device.

11. Means for as set forth in claim 10, wherein a third of the peripheral devices comprises the external interface and wherein transferring the captured bus transaction data comprises transferring the captured bus transaction data to an external device via the third peripheral device.

12. Means for as set forth in claim 11, wherein the third peripheral device comprises a Peripheral Component Interconnect (PCI) bus interface.

13. Means for as set forth in claim 10, wherein transferring the captured bus transaction data comprises transferring the captured bus transaction data to an external test device via the external interface.

* * * * *